United States Patent [19]

Horikawa

[11] Patent Number: 4,617,470
[45] Date of Patent: Oct. 14, 1986

[54] METHOD AND APPARATUS FOR DETECTING THE LEADING EDGE OF A SHEET TO BE SCANNED

[75] Inventor: Kazuo Horikawa, Minami-ashigara, Japan

[73] Assignee: Fuji Photo Film Co., Ltd., Minami-ashigara, Japan

[21] Appl. No.: 692,761

[22] Filed: Jan. 18, 1985

Related U.S. Application Data

[63] Continuation of Ser. No. 408,049, Aug. 13, 1982.

[30] Foreign Application Priority Data

Aug. 19, 1981 [JP] Japan ................................ 56-129809

[51] Int. Cl.[4] .............................................. G01V 9/04
[52] U.S. Cl. ..................................... 250/561; 358/293
[58] Field of Search ............... 250/561, 571, 234, 235, 250/236, 223 R, 327.2; 358/293

[56] References Cited

U.S. PATENT DOCUMENTS 3,739,177  6/1973  Ko ........................................ 250/561
3,792,262  2/1974  Ogawa et al. ........................ 250/561
4,142,105  2/1979  Erdmann ............................. 250/561
4,346,295  8/1982  Tanaka et al. ..................... 250/237.2
4,417,148 11/1983  Otake ................................. 250/223

Primary Examiner—David C. Nelms
Assistant Examiner—James Gatto
Attorney, Agent, or Firm—Gerald J. Ferguson, Jr.; Michael P. Hoffman; James E. Bryan

[57] ABSTRACT

Disclosed is a method and an apparatus for detecting the leading edge of a sheet which is on the way to the scanning-and-reading station of an image read-out system. Detection is performed by exposing, just ahead of the scanning-and-reading station, the traveling sheet to the same scanning beam of light as used at the scanning-and-reading station, and by detecting the sudden change in the amount of reflection on arrival of the sheet at the station due to the difference between the reflection coefficients of the sheet and the underlying conveyer belt. Preferably, the scanning for detecting the leading edge of the sheet is at a higher frequency and smaller amplitude than the scanning for reading an image on the sheet.

7 Claims, 4 Drawing Figures

F I G. 1
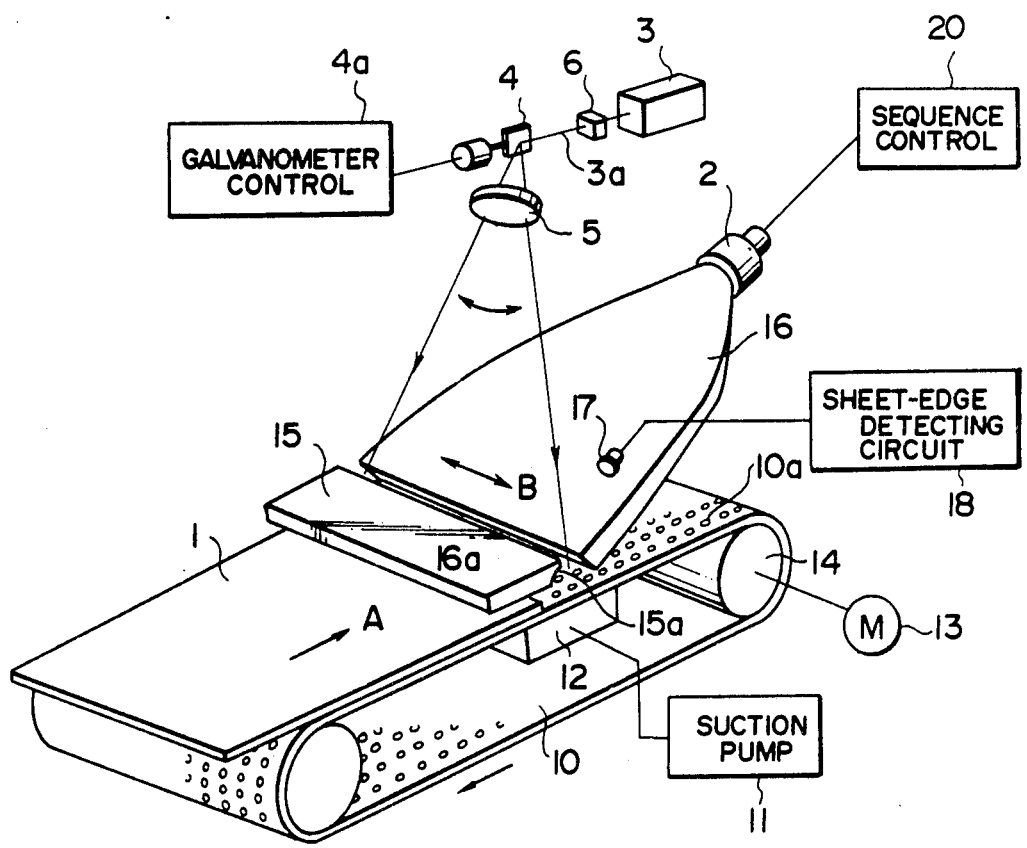

METHOD AND APPARATUS FOR DETECTING THE LEADING EDGE OF A SHEET TO BE SCANNED

This is a continuation application of Ser. No. 408,049 filed Aug. 13, 1982.

BACKGROUND OF THE INVENTION

1. Field of the Invention

This invention relates to a method and an apparatus for detecting the leading edge of a sheet-like object which is to be scanned in an image scanning system. More particularly, this invention relates a method and an apparatus for accurately detecting the leading edge of an image bearing sheet to be scanned in an image scanning system in which main scanning is performed on the sheet by making a beam of light oscillate back and forth quickly across the sheet in one direction and sub-scanning is performed on the sheet by moving the sheet in the direction perpendicular to said one direction.

2. Description of the Prior Art

In an image scanning system in which main scanning is performed on a sheet bearing image information by making a beam of light oscillate back and forth quickly across the sheet in one direction and in which sub-scanning is performed on the sheet by moving the sheet in the direction perpendicular to said one direction, it is not always necessary to detect the leading edge of the sheet which is on the way to the scanning station.

Sometimes, however, superposition processing is required in which a plurality of stimulable phosphor sheets or X-ray sensitive films each bearing the image or picture of the object simultaneously or sequentially taken from the same direction are scanned one by one to obtain the corresponding plurality of image signals, which are later superposed on each other to obtain an image or picture of high quality which is characterized by high signal-to-noise ratio and high contrast. Sometimes, a subtraction processing is required in which a selected portion is removed from an image or picture. The superposition and subtraction processings are described in detail in Japanese Unexamined Patent Publication No. 56(1981)-11400 and U.S. Patent Application Ser. Nos. 168,800 and 168,802. In these image processings, however, every time a subsequent sheet is presented to the scanning station, it is necessary for the scanning to start from the same point on the sheet thus presented. This necessitates the exact detection of the leading edge of each sheet on arrival at the scanning station.

For detecting the leading edge of each sheet to be scanned there have been hitherto proposed a mechanical detection system using limit switches, an optical detection system using a light projector and a light acceptor combined in the form of a photosensor, and an electric system using, in combination a timer and one of the aforesaid mechanical or optical detection systems, thereby detecting the leading edge of the sheet on its way to the scanning station with the aid of the mechanical or optical detection system, and then measuring a predetermined length of time with the air of the timer so as to predict the arrival of the leading edge of the sheet at a desired place after the lapse of the predetermined length of time from the detection of the leading edge of the sheet.

There are, however, various problems in practical use of these conventional detecting systems as mentioned below, and what is worse is that they are unable to detect the leading edge of the sheet with accuracy.

In the mechanical detection system using limit switches, there is little or no degree of freedom in positioning the limit switches, and accordingly there are strict restrictions on positioning the detection system in the image scanner. Also, the accuracy in detection is relatively low, and the detecting position cannot be, in fact, be changed, and therefore in handling sheets of different sizes it is necessary that there are provided a plurality of limit switches each allotted to the sheets of a different size. Detection is performed at a single point on the leading edge of the sheet, and therefore if there is a recess or irregularity on the leading edge of the sheet, the recess or irregularity causes erroneous detection. A mechanical force comes to bear on the sheet when it is brought in contact with the limit switch, and therefore it is possible that the sheet may be caused deviate from its course, thus making the feeding of sheets unreliable.

The optical detecting system using photosensors requires exact alignment of a light projector and a light acceptor at the detecting position, and accordingly there are strict restrictions on selecting positions. The detecting position cannot be changed, and detection of only a single point on the sheet causes appreciable errors. Different from the mechanical detection system, however, the optical detection system causes no mechanical force to bear on the sheet, and therefore the sheet can be advantageously fed in a stable and reliable condition. However, the optical detecting system requires that a light projector and a light acceptor be provided on opposite surface sides of the sheet, and this disadvantageously increases the cost and labor required for fabricating the system. The optical detection system is able to detect the leading edge of the sheet with higher accuracy than the mechanical detection system using limit switches. There is, however, a certain limit on the possible degree of reduction of the size of the beam spot or of the light receiving area of the light acceptor, and therefore it is not possible to obtain sufficient resolution to realize the required precision in image-superposition.

In the case of limit switches and photosensors, the position at which these units are fixed and the position at which detection should be performed are inevitably a small distance apart from each other, and therefore their positioning requires delicate positional adjustment.

SUMMARY OF THE INVENTION

In view of the defects of the prior art the object of this invention is to provide a method and an apparatus for detecting the leading edge of a sheet on the way to the scanning-and-reading station withe ease and accuracy.

More specifically the object of this invention is to provide a method and an apparatus which is capable of detecting the leading edge of a sheet on the way to the scanning-and-reading station with sufficient accuracy to permit precise sheet-positioning as required in superposition or subtraction processing.

The central feature of this invention is that the same beam of light as used in the main scanning is made to start scanning prior to arrival of the sheet at the scanning-and-reading station, and that the sudden change in the amount of reflection of light due to the difference between the reflection coefficients of the sheet and the sheet-carrying belt is detected as an indication of the arrival of the leading edge of the sheet at a desired place. Prior to the detection of the leading edge of the sheet on the way to the scanning-and-reading station the beam of light is preferably so controlled in diameter, the scanning frequency is increased, and the scanning amplitude is reduced, as compared with the corresponding factors in the main scanning, thereby permitting the detection of the leading edge of the sheet with increased efficiency and accuracy.

According to the teaching of this invention a beam of light which is used in scanning an image or picture on the sheet is used in detecting the leading edge of the sheet on the way to the scanning-and-reading station, thus obviating the necessity of providing an extra light projector for the purpose. Also, the leading edge of the sheet is detected as a line rather than as a point, thus substantially reducing the possibility of erroneous detection. Thanks to the very small size of the beam spot the accuracy with which the detection is performed is very high. (The leading edge of the sheet can be detected with an accuracy as high as one several tenths of one milimeter.)

When use is made of a galvanometer or some other readily available deflector, the detecting position can be changed without difficulty, thus obviating the necessity of providing a plurality of detectors each allotted for detecting the leading edges of sheets of a different size, and accordingly reducing the cost involved in manufacturing the detecting apparatus.

Other objects and advantages of this invention will be understood from the following description of preferred embodiments which are shown in the accompanying drawings:

BRIEF DESCRIPTION OF THE DRAWINGS

FIG. 1 is a perspective view of an image read-out system equipped with an apparatus for detecting the leading edge of a sheet on the way to the scanning-and-reading station of the system.

DESCRIPTION OF THE PREFERRED EMBODIMENT

Figure 2:
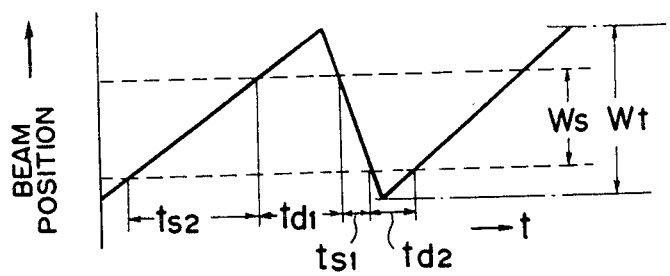
FIGS. 2 and 3 show graphs representing the instantaneous position of the scanning beam spot in terms of time.

Referring to FIG. 1, there is shown an image read-out apparatus to which the present invention is applied. In the image read-out apparatus a beam of exciting light is projected onto a sheet particularly a stimulable phosphor sheet 1 bearing a latent image thereon, and a photodetector such as photomultiplier 2 detects the luminescence thus generated from the phosphor sheet to produce an image signal. The phosphor sheet has been exposed to radiation such as X-ray radiation passing through a human body or some other object under examination, and the phosphor sheet stores an image of the human body or other object thus taken. The phosphor sheet 1 is brought in the direction as indicated by arrow "A" to a scanning-and-reading station in which a laser beam 3a from a laser source 3 is made to oscillate back and forth by a deflection mirror 4 of a galvanometer. The oscillation of the laser beam is controlled both in amplitude and frequency by a galvanometer control 4a. The oscillating laser beam after passing through an fθ lens 5 falls on the phosphor sheet 1 to perform main scanning in the crosswise direction as indicated by arrow "B" for the purpose of reading out the latent image on the phosphor sheet. There is provided in the optical path of the laser beam an optical unit 6 for adjusting the beam diameter, whereby the size of the beam spot falling on the phosphor sheet is adjusted.

The phosphor sheet 1 is brought by an endless conveyor belt 10 in the direction as indicated by arrow "A", and sub-scanning is carried out as the phosphor sheet 1 proceeds in the direction "A". The endless conveyor belt 10 has numerous ventilation apertures 10a, and there is provided a suction box 12 under the endless conveyor belt 10 at the scanning-and-reading station. A negative pressure is applied to the suction box 12 by a suction pump 11, thus positively holding the phosphor sheet 1 on the endless conveyor belt 10 in the proper place. A drive motor 13 rotates an associated roll 14 to drive the endless belt 10. A reflection plate 15 is provided above the endless belt 10 with its reflection surface 15a directed to the scanning position. Thus, the luminescence caused by the scanning beam impinging on the phosphor sheet reflects on the reflection surface 15a of the reflection plate 15 and proceeds to the inlet or incidence surface 16a of a condenser 16. The condenser 16 is a light transmission member made of an acryl plate (see U.S. Patent Application Ser. No. 105,240), which functions to receive the incident light at its inlet surface 16a and transmit the same to the photomultiplier 2 located at its outlet end. The photomultiplier 2 generates an image signal which is directed to an image read-out means 20 where necessary operations are performed for image-recording, image-reproduction and the like.

The surface of the endless conveyor belt 10 has characteristics of reflection which are different from those of the surface of the phosphor sheet 11, as for instance the surface of the endless belt is dark-colored, thereby presenting a relatively low coefficient. When the sheet 1 laid on the dark-colored conveyor belt reaches the scanning-and-reading station, the scanning beam of light reflects from the surface of the sheet to yield a relatively strong reflection of light above the sheet. A detector 17 for detecting the leading edge of the phosphor sheet is set at such a position where it receives the substantial part of the reflected light. With this arrangement when the leading edge of the sheet has reached the scanning-and-reading station, the detector 17 detects the reflected light to generate a detection signal which it passes to a sheet-edge detecting circuit 18. A photomultiplier or a semiconductor sensor may be used as the detector. A semi-conductor sensor is more suitable because it is less expensive and easier to handle. Preferably the detector 17 is positioned above the conveyor belt 10 inside the belt edge so that it can receive the reflected light without fail irrespective of the size of the sheet.

In detecting the leading edge of the sheet 1, first, the operator starts the drive motor 13 for rotating the roll 14 to drive the endless belt 10 in the direction "A" in which the sub-scanning is performed. Then, a sheet is laid on the conveyor belt 10 to move it towards the scanning-and-reading station, and the scanning by the laser beam 3a starts at a proper moment (prior to the arrival of the leading edge of the sheet 1 at the scanning-and-reading station). The moment at which the scanning is started may be determined by detecting the supply of a sheet onto the belt with the aid of a detector such as a limit switch or photosensors, or by manually operating a switch which is provided for the purpose. If it is desired to read a plurality of sheets in a continuous way, the scanning continues without interruption.

It is after desired that the scanning for the purpose of detecting the leading edge of the sheet be performed with different operating factors (frequency, amplitude, laser beam size and the like) from those in the scanning for the purpose of reading an image from the sheet. Hereinafter described is an apparatus capable of selectively switching between one mode of scanning and another. Needless to say, however, scanning at the same frequency, amplitude and laser beam size as the scanning for image read-out can be used for the purpose of detecting the leading edge of the sheet.

The scanning for detecting the leading edge of the sheet is controlled by a galvano-control 4a and is performed at a relatively high frequency and a relatively small amplitude.

Figure 3:
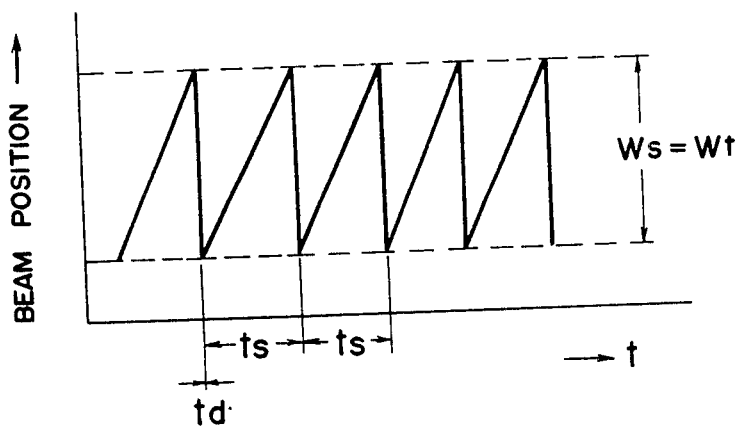

Referring to FIG. 2 there is shown a graph wherein the scanning beam position is plotted in terms of time, where "Ws" and "Wt" stand for the width of the sheet 1 and the sweep range of the laser beam respectively. While the laser beam is running beyond the width of the sheet "Ws" [td(dead time)=td 1+td 2], the laser beam is unable to detect the leading edge of the sheet even if the sheet has reached the area of the scanning-and-reading station. The length of time for which the scanner is able to detect the leading edge of the sheet is limited to "ts" which is equal to "ts 1" plus "ts 2". In order to elongate the sensitive time "ts" and shorten the insensitive time "td", it is necessary to reduce the sweep range "Wt" to close to the width of the sheet "Ws". The dead time "td" can be made zero if "Wt" is less than "Ws". FIG. 3 shows a similar graph in case of "Wt" being equal to "Ws". Here, the dead time "td" is reduced to zero.

Both the sensitive time "ts" and the dead time "td" decrease with increase in the frequency at which the laser beam oscillates back and forth. By increasing the scanning frequency the dead time can be cut to a minute length, and accordingly the insensitivity due to dead time is reduced. On the other hand the spatial frequency rises accordingly, thus bringing the crosswise sweep trace fairly parallel to the leading edge of the sheet (which proceeds in the direction perpendicular to the scanning direction), and accordingly raising the accuracy with which the apparatus detects the leading edge of the sheet.

Needless to say, the resolution increases with decreasing size of the laser beam spot.

Figure 4:
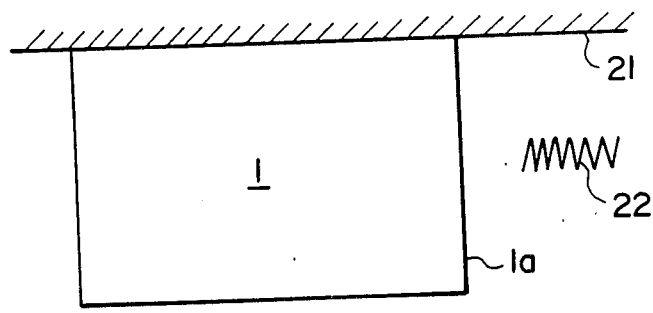
FIG. 4 is a plane view showing a preferable mode of positioning a sheet on a conveyor belt equipped with a longitudinal guide thereon.

With a view to assuring that a plurality of sheets 1 to be subjected to superposition or subtraction processing are loaded at the same position on the endless belt 10, there is provided a longitudinal guide 21 along one side of the endless belt as shown in FIG. 4. Assuming that a plurality of sheets of similar shape are laid one by one on the conveyor belt and pushed against the longitudinal guide of the conveyor, the leading edge of each sheet is assured to be within given limits from the longitudinal guide 21. Then, the scanning beam is made to oscillate back and forth about a center within these limits at a relatively high frequency and a relatively small amplitude as indicated by 22 in FIG. 4, thereby detecting the leading edge of the sheet with increased accuracy. Even if the leading edge 1a of the sheet is somewhat slanted, the leading edge is always in a fixed positional relation relative to the sheet edge detecting position thanks to the longitudinal guide, thus permitting the exact detection of the leading edge of the sheet without causing any error due to the inclination of sheet edge.

As mentioned above, the fine scanning beam oscillates back and forth with a relatively small amplitude at a relatively high frequency in the direction as indicated by arrow "B". then, when the leading edge of the sheet comes to the scanning-and-detecting station, a large quantity of light falls suddenly on the photodetector 17 because the sheet surface reflects much more light than the belt surface, thus generating a leading edge detecting signal which is sent to the associated leading edge detection circuit 18. The detection circuit 18 responds to the detection signal by directing a start signal to the image read-out means (a sequence control) 20. Then, the sequence control 20 changes the scanning frequency, amplitude, beam size and other factors to those for the main scanning. The sheet is subjected to sub-scanning when it travels in the direction as indicated by arrow "A". With the main and subscannings the phosphor sheet generates luminescence in the shape of an image and the so generated luminescence is collected in the photomultiplier 2 through the light collecting member (condensor) 16. Then, the photomultiplier 2 generates an image signal. Thus, a read-out of the image from the phosphor sheet is conducted.

As is apparent from the above, the method and apparatus according to this invention are able to detect, in an image read-out system, the leading edge of the sheet with increased accuracy without necessitating extra and expensive means, and therefore the method and apparatus according to this invention can be advantageously used.

This invention has been described above as being applied to detecting the leading edge of the stimulable phosphor sheet in an image read-out system in which the image is read with the aid of an exciting beam of light. This, however, should be understood as an example of application and this invention can be equally applied to any kind of image scanning system. Also, this invention should not be understood as limited to an image read-out system. In fact, this invention can be applied to a recording system using a light beam scanner or to any other system in which the moment at which a given treatment of image or picture starts, must be determined.

I claim:

1. A method of detecting the leading edge of a sheet-like object to be scanned in an image scan system wherein main scanning of the sheet-like object is performed by making a beam of light oscillate back and forth in a first direction with the aid of optical deflection means, disposing said sheet-like object in a plane containing said first direction and sub-scanning of the sheet-like object is performed by moving the sheet like object within said plane in the direction perpendicular to said first direction, the method comprising:
    oscillating a light beam back and forth in said first direction, the method comprising:
    moving the sheet-like object in the sub-scanning direction toward the oscillating light beam;
    detecting the reflection of said beam of light from the leading edge of said sheet-like object, thereby detecting the leading edge of the sheet.

2. The method as claimed in claim 1, wherein said sheet-like object has a predetermined degree of reflectivity; said sheet-like object is moved in the subscanning direction by placing the sheet-like object on a support member, said support member having a different degree of reflectivity from said sheet-like object, and moving said support member in the sub-scanning direction; and the reflection of said beam of light from the leading edge of said sheet-like object is detected by detecting the change in the amount of light reflected as said beam passes from main scanning said support member to said sheet-like object.

3. In an image read-out apparatus comprising an optical deviation means for making a beam of light oscillate back and forth across a sheet-like object in a main scanning direction; means for moving the sheet-like object in a subscanning direction perpendicular to the main scanning direction; and read-out means for receiving light from the surface of the sheet-like object being scanned, the light representing an image on the sheet; the improvement comprising:

detecting means for detecting light from said oscillating beam reflected from the leading edge of said sheet-like object and generating a signal upon detection of said reflected light;
  means responsive to said signal for indicating the presence of the leading edge of the sheet-like object to said read-out means.

4. The image read-out apparatus as claimed in claim 3, wherein said detecting means comprises a photodetector.

5. In an image read-out apparatus comprising an optical deviation means for making a beam of light oscillate back and forth across a stimulable phosphor sheet-like object in a main scanning direction, said beam of light being capable of exciting the stimulable phosphor to luminescence; sub-scanning means for moving the sheet-like object in a direction perpendicular to the main scanning direction; and read-out means, sensitive at least to the luminescence generated from the stimulable phosphor when exposed to said beam of light in scanning, for receiving light from the surface of the stimulable phosphor sheet-like object being scanned, the light representing an image on the sheet-like object; the improvement comprising:

detecting means for detecting light from the leading edge of said sheet-like object, said detecting means being sensitive at least to the luminescence generated from the phosphor when exposed to and excited by said beam of light, and generating a signal upon detection of said light;
  means responsive to said signal for indicating the presence of the leading edge of the sheet-like object to said read-out means.

6. In an image read-out apparatus comprising means for making a beam of light oscillate back and forth across a sheet-like object in a main scanning direction; means for moving the sheet-like object in a sub-scanning direction perpendicular to the main scanning direction; and a photomultiplier positioned to receive light from the surface of the sheet-like object being scanned; the improvement comprising:

a semiconductor sensor positioned to receive light from said oscillating beam reflected from the leading edge of said sheet-like object, and generating a signal upon detection of said reflected light indicating the presence of said leading edge.

7. In an image read-out apparatus comprising means for making a beam of light oscillate back and forth across a stimulable phosphor sheet-like object in a main scanning direction, said beam of light being capable of exciting the stimulable phosphor to luminescence; means for moving the sheet-like object in a sub-scanning direction perpendicular to the main scanning direction; and a photomultiplier positioned to receive light from the surface of the sheetlike object being scanned; the improvement comprising:

a semiconductor sensor positioned to detect luminescence from the leading edge of said sheet-like object, said sensor being sensitive to luminescence generated from the stimulable phosphor when exposed to and excited by said beam of light, and generating a signal upon detection of said luminescence indicating the presence of said leading edge.

* * * * *